United States Patent [19]

Ebert et al.

[11] 4,096,231
[45] Jun. 20, 1978

[54] SEPARATION OF URANIUM HEXAFLUORIDE FROM PLUTONIUM HEXAFLUORIDE BY MEANS OF SELECTIVE INTERCALATION IN GRAPHITE

[75] Inventors: Lawrence B. Ebert, John P. DeLuca, both of New Providence, N.J.

[73] Assignee: Exxon Research and Engineering Company, Linden, N.J.

[21] Appl. No.: 743,073

[22] Filed: Nov. 18, 1976

[51] Int. Cl.$^2$ .................... C01G 42/06; C01G 56/00
[52] U.S. Cl. .................................... 423/19; 423/251; 423/258
[58] Field of Search .............. 423/19, 251, 258

[56] References Cited

U.S. PATENT DOCUMENTS

| | | | |
|---|---|---|---|
| 3,536,532 | 10/1970 | Watanabe et al. | 429/194 |
| 3,708,568 | 1/1973 | Golliher et al. | 423/19 |
| 3,925,536 | 12/1975 | Schuman | 423/19 |

OTHER PUBLICATIONS

Maire, Proc. Second U.N. Intern. Conf. Peaceful Uses Atomic Energy, 28, United Nations, (1958), Geneva, pp. 394–395.

Binenboym et al., J. Inorg. Nucl. Chem., 38, (12), 2313–2314.

Primary Examiner—Edward A. Miller
Attorney, Agent, or Firm—Joseph J. Allocca

[57] ABSTRACT

A method is disclosed for the selective separation and sequestering of plutonium from uranium which comprises contacting a gas stream containing uranium hexafluoride [at a partial pressure of 26 torr or less] and plutonium hexafluoride at any pressure with graphite whereby $PuF_6$ is selectively intercalated into the graphite while $UF_6$ is left unreacted in the gas stream. Preferably, the contacting of $UF_6$ and $PuF_6$ with graphite is conducted in the presence of excess fluorine.

In another embodiment the graphite is first reacted with a chemical oxidant. Such pretreatment of the graphite renders it inert to $UF_6$ intercalation at partial pressures over 26 torr, the pressure above which $UF_6$ normally intercalates with graphite. Such pretreatment will have less effect on $PuF_6$ intercalation into the prereacted graphite compound and therefore will permit the separation of $UF_6$-$PuF_6$ by differential intercalation into the prereacted graphite compound to be conducted at higher partial pressures of $UF_6$.

5 Claims, 1 Drawing Figure

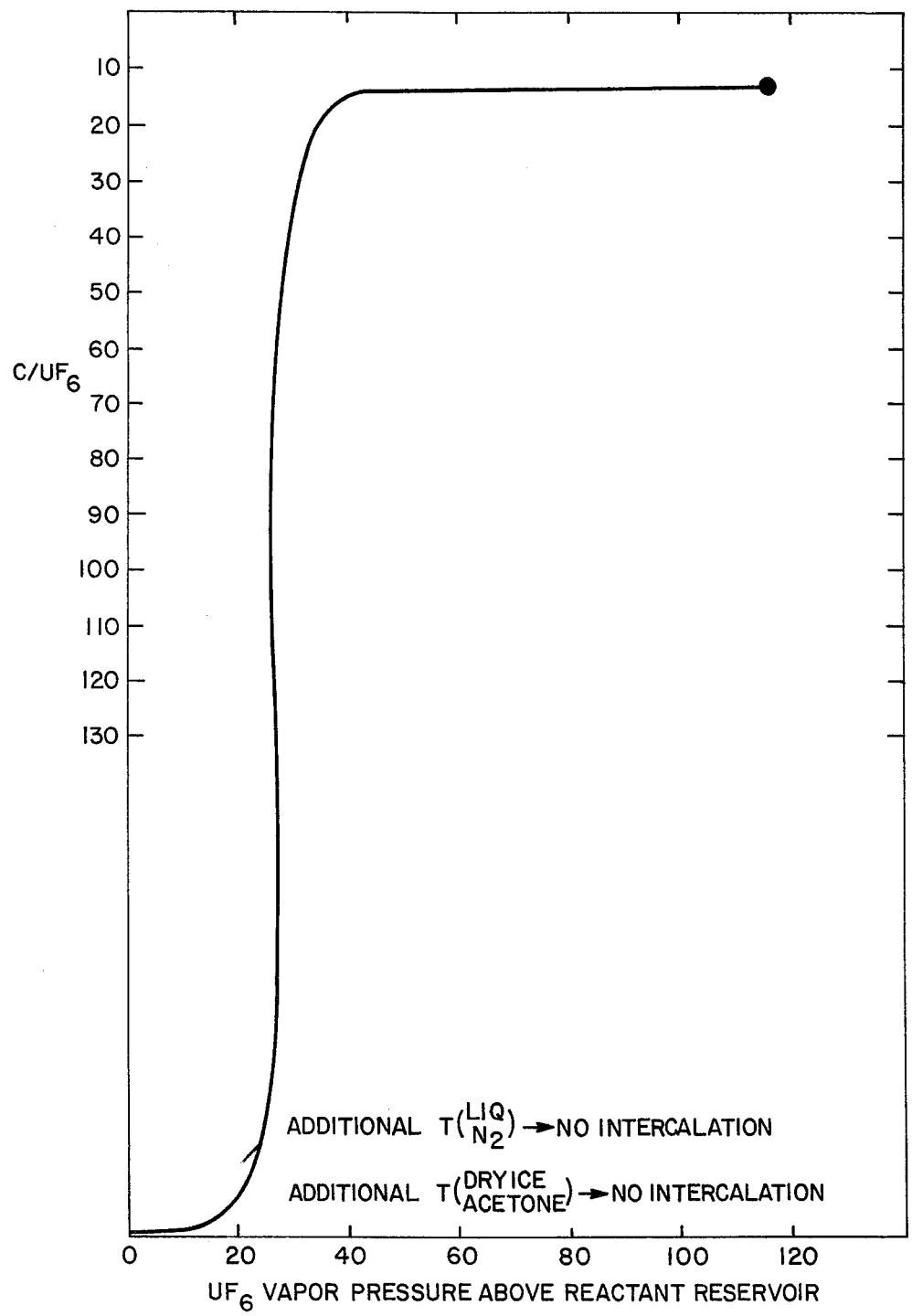

SEPARATION OF URANIUM HEXAFLUORIDE FROM PLUTONIUM HEXAFLUORIDE BY MEANS OF SELECTIVE INTERCALATION IN GRAPHITE

BODY OF DISCLOSURE

It has been discovered and forms the basis of this disclosure that at partial pressures of less than 26 torr $UF_6$ will not intercalate into graphite. However, by virtue of its higher activity, $PuF_6$ can be expected to react with graphite at threshold partial pressures of less than 26 torr, i.e. a partial pressure at which $UF_6$ will not intercalate with graphite.

Consequently, based upon this discovery of a threshold pressure for $UF_6$ intercalation with graphite, a method is disclosed for the selective separation and sequestering of plutonium from uranium which comprises contacting uranium hexafluoride and plutonium hexafluoride with graphite at a $UF_6$ partial pressure of less than 26 torr whereby $PuF_6$ is selectively intercalated into the graphite while $UF_6$ remains unreacted, thereby effecting the desired separation. Preferably, the contacting of $UF_6$ and $PuF_6$ with graphite is conducted in the presence of excess fluorine. This is a consequence of the following thermodynamic relationship: considering the reaction $$MF_4 + F_2 \rightleftarrows MF_6,$$

it shows at room temperature:

$$Kp(UF_6) = [UF_6]/[F_2] = 10^{44}$$

$$Kp(PuF_6) = [PuF_6]/[F_2] = 4 \times 10^{-5}$$

In the graphite compound, both metals (M = Pu and U) will exist in the tetravalent state. This has been demonstrated by NMR and EPR for "graphite/$UF_6$". In view of the fact that pentavalent Pu is not a favorable oxidation state "graphite/$PuF_6$" should contain tetravalent Pu. Any increase of fluorine pressure will, thermodynamically, force deintercalation of tetravalent uranium in graphite while leaving tetravalent plutonium untouched. In this manner, graphite becomes a "sink" and a container for the plutonium in the tetravalent oxidation state while rejecting thermodynamic intercalation with $UF_6$.

Prior to the instant invention, the existence of a threshold $UF_6$-graphite intercalation pressure was unknown.

Les Carbones, Vol. II, A. Herold, R. Setton, N. Platzer, eds, Masson et Cie, Paris, 1965 p. 563, references an article by J. Maire in the *Proc. Second U.N. Intern. Conf. Peaceful Uses Atomic Energy*, 28, and Geneva, 1958, pp 392-395; "Fixation of Bromine and Uranium Hexafluoride on Carbons".

In this Paper, a series of tests were performed on spectroscopically pure material graphites and artificial graphites and medium graphitization.

One test involved introducing $UF_6$ at high pressure over carbon under vacuum at room temperature. At 300° C, $UF_6$ was irreversibly desorbed.

In another test, $UF_6$ was introduced at low pressure to graphite at saturation, natural graphite gained 175% of initial weight, artificial graphite gained 300% of initial weight. Basing weight gain as $UF_6$ adsorbed, these weights correspond to the formula $C_{16.7}UF_6$ and $C_{9.77}UF_6$ respectively. At 250° C, a reversible desorption of 80% of the material was performed in the artificial graphite specimen.

In yet another test, $UF_6$ was quickly brought into contact with graphite and it was not possible to desorb $UF_6$ at temperatures of to 300° C.

All of these experiments resulted in intercalation of $UF_6$ into graphite and would lead one to the inevitable conclusion that intercalation of $UF_6$ into graphite results at all conditions.

The instant separation method is based upon the discovery that at partial pressures below 26 torr $UF_6$ will not intercalate into graphite. Figure I is the graphite/$UF_6$ intercalation isotherm. From this it is clearly seen that a definite threshold partial pressure exists below which the amount of $UF_6$ which intercalates into graphite is negligible, approaching zero. The threshold pressure is about 26 torr.

By means of this discovery a separation process can be described for the separation of uranium from plutonium involving passing $UF_6$ and $PuF_6$ over graphite at a $UF_6$ partial pressure of less than 26 torr whereby because of the greater reactivity of $PuF_6$ it will intercalate into graphite while $UF_6$ will not intercalate because the contacting occurs at less than the threshold pressure.

Preferably, this contacting is performed in the presence of excess fluorine since such excess fluorine will participate in the de-intercalation of any $UF_6$ which may have sufficient energy to intercalate.

The process of the instant invention may be practiced using any type of graphite from any typical source. Normally graphite has a structure consisting of a hexagonal unit cell with dimensions $A_o = (2.45 \pm 0.10)$A $C_o = (6.7 \pm 0.20)$A. The only graphite which should be avoided is highly C axis oriented pseudo single crystal pyrolytic graphite.

Alternatively, the graphite may be pretreated with an oxidant which oxidizes the graphite and renders it resistant to $UF_6$ intercalation. Graphite reacted with $CrO_3/CH_3CO_2H$ and $CF_3CO_2H/KMnO_4$ (not in excess) results in the known intercalation compounds $C_{13}CrO_3$ and $C_{30}CF_3CO_2H$. $UF_6$ will not intercalate into these compounds at pressures at which it will intercalate into untreated graphite, i.e. partial pressures over 26 torr. Therefore, for situations requiring that graphite be in contact with $UF_6$ and remain unreacted with $UF_6$, graphite pretreated with an intercalating oxidant should be used. In this manner, it is possible to produce a graphite material useful in electrochemical reactions and processes. Typical useful oxidants are selected from the group consisting of $CuCl_2$, $CuBr_2$, $AuCl_3$, $AlCl_3$, $GaCl_3$, $InCl_3$, $AlBr_3$, $TiCl_3$, $ZrCl_4$, $HfCl_4$, $SbCl_5$, $TaCl_5$, $FeCl_3$, $CrCl_3$, $CrO_2Cl_2$, $CrO_2F_2$, $MoCl_5$, $\alpha$-$WCl_6$, $UCl_4$, $UO_2Cl_2$, $UF_6$, $ReCl_4$, $CoCl_3$, $RuCl_3$, $RhCl_3$, $PdCl_4$, $PtCl_4$, $IrCl_4$, $ICl$, $ICl_3$, $YCl_3$, $SmCl_3$, $CdCl_3$, $YbCl_3$, $DyCl_3$, $EuCl_3$, $HF$, $ClF_3$, $BrF_3$, $TiF_4$, $IF_5$, $AsF_5$, $SbF_5$, $NbF_5$, $TaF_5$, $XeF_6$, $XeOF_4$, $SbF_3Cl_2$, $HgCl_2$, $MnCl_2$, $NiCl_2$, $ZnCl_2$, $CdCl_2$, $UCl_5$, $NbCl_5$, $MoOCl_4$, $GaBr_3$, $AuBr_3$, preferably $CrO_3$ and $CF_3CO_2H$.

What is claimed is:

1. A method for selectively separating and sequestering plutonium from uranium comprising contacting a uranium hexafluoride and plutonium hexafluoride mixture with graphite at a $UF_6$ partial pressure of 26 torr or less whereby $PuF_6$ is selectively intercalated into the graphite while the graphite is resistant to $UF_6$ intercalation at such $UF_6$ partial pressure.

2. The method of claim 1 wherein the contacting of the mixture of uranium hexafluoride and plutonium hexafluoride with graphite is conducted in the presence of excess fluorine.

3. The method of claim 1 wherein the graphite has been pretreated with an oxidant rendering said graphite more resistant to $UF_6$ intercalation.

4. A method for selectively separating and sequestering plutonium from uranium comprising contacting a mixture of uranium hexafluoride and plutonium hexafluoride with graphite that has been pretreated with a oxidant rendering said graphite more resistant to $UF_6$ intercalation, at a $UF_6$ partial pressure of greater than 26 torr, whereby $PuF_6$ is selectively intercalated into said graphite, said graphite being resistant to $UF_6$ intercalation at such $UF_6$ partial pressure.

5. The method of claim 4 wherein the contacting of the mixture of uranium hexafluoride and plutonium hexafluoride with graphite is conducted in the presence of excess fluorine.

* * * * *